(12) United States Patent
Wooster et al.

(10) Patent No.: US 7,659,343 B2
(45) Date of Patent: Feb. 9, 2010

(54) FILM LAYERS MADE FROM ETHYLENE POLYMER BLENDS

(75) Inventors: Jeffrey J. Wooster, Houston, TX (US); Thomas Oswald, Lake Jackson, TX (US); Staci A. DeKunder, Pearland, TX (US); Jesus Nieto, Tarragona (ES)

(73) Assignee: Dow Global Technologies, Inc., Midland, MI (US)

( * ) Notice: Subject to any disclaimer, the term of this patent is extended or adjusted under 35 U.S.C. 154(b) by 535 days.

(21) Appl. No.: 10/560,323

(22) PCT Filed: Jun. 2, 2004

(86) PCT No.: PCT/US2004/017447

§ 371 (c)(1), (2), (4) Date: Dec. 9, 2005

(87) PCT Pub. No.: WO2004/111123

PCT Pub. Date: Dec. 23, 2004

(65) Prior Publication Data

US 2007/0093603 A1 Apr. 26, 2007

(51) Int. Cl.
C08L 23/04 (2006.01)
C08L 23/08 (2006.01)
C08J 5/18 (2006.01)
B32B 27/32 (2006.01)

(52) U.S. Cl. .................... 525/191; 525/240
(58) Field of Classification Search ............ 525/191, 525/240
See application file for complete search history.

(56) References Cited

U.S. PATENT DOCUMENTS

| | | | |
|---|---|---|---|
| 4,322,027 A | 3/1982 | Reba | |
| 4,340,563 A | 7/1982 | Appel | |
| 4,352,849 A | 10/1982 | Mueller | |
| 4,413,110 A | 11/1983 | Kavesh et al. | |
| 4,597,920 A | 7/1986 | Golike | |
| 4,663,220 A | 5/1987 | Wisneski et al. | |
| 4,668,566 A | 5/1987 | Braun | |
| 4,798,081 A | 1/1989 | Hazlitt et al. | |
| 4,820,557 A | 4/1989 | Warren | |
| 4,837,084 A | 6/1989 | Warren | |
| 4,865,902 A | 9/1989 | Golike et al. | |
| 4,927,708 A | 5/1990 | Herran et al. | |
| 4,952,451 A | 8/1990 | Mueller | |
| 4,963,419 A | 10/1990 | Lustig et al. | |
| 5,059,481 A | 10/1991 | Lustig et al. | |
| 5,089,321 A | 2/1992 | Chum et al. | |
| 5,228,531 A | 7/1993 | Patterson et al. | |
| 5,272,236 A | 12/1993 | Lai et al. | |
| 5,278,272 A | 1/1994 | Lai | |
| 5,360,648 A | 11/1994 | Falla et al. | |
| 5,364,486 A | 11/1994 | Falla et al. | |
| 5,677,383 A | 10/1997 | Chum et al. | |
| 5,721,025 A | 2/1998 | Falla et al. | |
| 5,844,045 A | 12/1998 | Kolthammer et al. | |
| 5,869,575 A | 2/1999 | Kolthammer et al. | |
| 5,874,139 A * | 2/1999 | Bosiers et al. | 428/35.2 |
| 5,879,768 A | 3/1999 | Falla et al. | |
| 5,942,579 A | 8/1999 | Falla et al. | |
| 6,117,465 A | 9/2000 | Falla et al. | |
| 6,143,829 A | 11/2000 | Babb et al. | |
| 6,359,073 B1 | 3/2002 | Babb et al. | |
| 6,448,341 B1 | 9/2002 | Kolthammer et al. | |
| 6,528,136 B1 | 3/2003 | Ho et al. | |
| 6,538,070 B1 | 3/2003 | Cardwell et al. | |
| 6,545,088 B1 | 4/2003 | Kolthammer et al. | |
| 6,566,446 B1 | 5/2003 | Parikh et al. | |
| 6,723,398 B1 * | 4/2004 | Chum et al. | 428/35.2 |
| 2006/0046048 A1 * | 3/2006 | Kapur et al. | 428/349 |

FOREIGN PATENT DOCUMENTS

| | | |
|---|---|---|
| WO | WO-98/21274 | 5/1998 |
| WO | WO-99/10424 | 3/1999 |
| WO | WO-01/32771 A1 | 5/2001 |
| WO | WO-2004/072176 A2 | 8/2004 |

OTHER PUBLICATIONS

Wild, et al., "Determination of Branching Distributions in Polyethylene and Ethylene Copolymers," Journal of Polymer Science: Polymer Physics Edition, 1982, pp. 441-455, vol. 20, John Wiley & Sons, Inc.

T. Williams and I.M. Ward, "The Construction of a Polyethylene Calibration Curve for Gel Permeation Chromotography using Polystyrene Fractions," Journal of Polymer Science: Polymer Letters, 1968, p. 621, vol. 6, H.H. Wills Physics Laboratory.

* cited by examiner

*Primary Examiner*—Nathan M Nutter

(57) ABSTRACT

Film layers made from formulated ethylene polymer compositions are disclosed. Film layers made from such formulated compositions have surprisingly good heat seal properties, and an especially good reduction in heat seal initiation temperature. The ethylene polymer compositions have at least one homogeneously branched ethylene/alpha-olefin interpolymer and at least one homogeneously or heterogeneously branched ethylene polymer which has a lower melt index than the first mentioned component. The first homogeneously branched ethylene/alpha-olefin interpolymer has a melt index higher than that of the formulated composition.

7 Claims, 14 Drawing Sheets

GEL PERMEATION CHROMATOGRAPHY

| Description | Example 1 |
|---|---|
| Mw | 98,500 |
| Mp | 61,800 |
| Mn | 34,100 |
| Mw/Mn | 2.89 |
| Avg Log Mw 25% | 210,132 |
| Avg Log Mw 50% | 82,631 |
| Avg Log Mw 75% | 44,983 |
| Avg Log Mw 100% | 16,536 |
| Avg Log Mw Whole | 59,948 |
| Avg Log Mw Whole | 4.83 |

GEL PERMEATION CHROMATOGRAPHY

| Description | Comparative Example 2 |
|---|---|
| Mw | 110,400 |
| Mp | 66,700 |
| Mn | 29,200 |
| Mw/Mn | 3.78 |
| Avg Log Mw 25% | 255,147 |
| Avg Log Mw 50% | 95,345 |
| Avg Log Mw 75% | 43,993 |
| Avg Log Mw 100% | 13,480 |
| Avg Log Mw Whole | 61,630 |
| Avg Log Mw Whole | 6.40 |

Hot Tack
0.5 mil Polymer A / 1.0 mil 75% Polymer A + 25% Polymer C / 1.0 mil Sealant

GEL PERMEATION CHROMATOGRAPHY

| Description | Example 2 |
|---|---|
| Mw | 94,200 |
| Mp | 62,400 |
| Mn | 31,100 |
| Mw/Mn | 3.03 |
| Avg Log Mw 25% | 200,731 |
| Avg Log Mw 50% | 81,035 |
| Avg Log Mw 75% | 43,389 |
| Avg Log Mw 100% | 15,142 |
| Avg Log Mw Whole | 57,176 |
| Avg Log Mw Whole | 4.98 |

DOW CRYSTAF 3D Report
Example 2

Hot Tack Strength
1.0 mil Polymer G / 1.0 mil Polymer H / 1.5 mil Sealant

FILM LAYERS MADE FROM ETHYLENE POLYMER BLENDS This invention relates to compositions comprising specific ethylene/alpha-olefin polymer blends. The polymer blends preferably comprise: (A) at least one homogeneously branched ethylene/alpha-olefin interpolymer having specific characteristics, blended together with (B) a homogeneously or heterogeneously branched ethylene polymer. Such compositions are particularly useful in film applications (e.g., heat sealable packaging film).

Thin film products fabricated from linear low density polyethylene (LLDPE) and/or high density polyethylene (HDPE) are widely used for packaging applications such as merchandise bags, grocery sacks, food and specialty packaging and industrial liners. For these applications, films with low heat seal initiation temperatures and good heat seal properties (for example, seal strength) are desired because film producers can run their packaging lines faster with less exact temperature control and still retain packaging performance.

Previous attempts were made to optimize film heat seal strengths by blending various heterogeneous polymers. However, in these cases, the resulting seal strength followed the rule of mixtures, meaning that the seal strength of the blend was less than one of the components. No synergy relating to seal strength of these blends was observed.

There is a continuing need to develop polymers which can be formed into fabricated articles (for example, film) having these combinations of properties (for example, improved modulus, yield strength, impact strength and tear strength). The need is especially great for polymers which can be made into film which can also be down gauged without loss of strength properties, resulting in savings for film manufacturers and consumers, as well as protecting the environment by source reduction.

Surprisingly, we have now discovered that film can have synergistically enhanced physical properties when the film is made from a blend of at least one homogeneously branched ethylene/alpha-olefin interpolymer and a homogeneously or heterogeneously branched ethylene/alpha-olefin interpolymer. These enhanced properties can include lower heat seal and hot tack initiation temperatures, greater range of temperatures for the seal bar, improved Elmendorf tear A, 2 percent MD Secant modulus, blocking force, and haze.

Formulated ethylene/alpha-olefin compositions have now been discovered to have improved physical and mechanical strength and are useful in making fabricated articles. Films and film layers made from these novel compositions exhibit surprisingly good heat seal properties at low heat seal initiation temperatures and are useful as sealants or caulking materials, especially between film layers.

The compositions comprise:

(A) from 10 percent (by weight of the total composition) to 95 percent (by weight of the total composition) of at least one homogeneously branched ethylene/alpha-olefin interpolymer having:

(i) a density from 0.86 grams/cubic centimeter (g/cm$^3$) to 0.92 g/cm$^3$, (ii) a molecular weight distribution (Mw/Mn) from 1.8 to 2.8, (iii) a melt index (I$_2$) from 0.2 grams/10 minutes (g/10 min) to 200 g/10 min, (iv) no high density fraction; and (B) from 5 percent (by weight of the total composition) to 90 percent (by weight of the total composition) of at least one heterogeneously branched ethylene polymer having a density from 0.88 g/cm$^3$ to 0.945 g/cm$^3$, wherein the composition has a melt index lower than the melt index of (A).

In a related embodiment, the compositions comprise:

(A) from 10 percent (by weight of the total composition) to 95 percent (by weight of the total composition) of at least one homogeneously branched ethylene/alpha-olefin interpolymer having:

(i) a density from 0.86 grams/cubic centimeter (g/cm$^3$) to 0.92 g/cm$^3$, (ii) a molecular weight distribution (Mw/Mn) from 1.8 to 2.8, (iii) a melt index (I$_2$) from 0.2 grams/10 minutes (g/10 min) to 200 g/10 min, (iv) no high density fraction; and (B) from 5 percent (by weight of the total composition) to 90 percent (by weight of the total composition) of at least one homogeneously branched ethylene polymer having a density higher than component (A) and wherein the density is from 0.88 g/cm$^3$ to 0.945 g/cm$^3$;

wherein the polymer composition has a melt index lower than the melt index of the component (A).

In another aspect, at least one film layer is made from a polymer composition, wherein the composition has an ATREF-DV characterized by having at least 1 low temperature peak between 30° C. and 90° C., wherein the lowest temperature peak has an Mv lower than the average Mv of the composition. It is preferred that the lowest temperature peak has an Mv which is at least 6 percent lower than the average Mv of the composition, more preferably at least 7 percent, 8 percent, 9 percent, 10 percent, 11 percent, 12 percent, 13 percent, 14 percent, or most preferably at least 15 percent lower than the average Mv for the total composition. Preferably, the lowest temperature peak has an Mv which is no more than 40 percent lower than the average Mv of the composition, more preferably no more than 35 percent, 33 percent, 31 percent, 29 percent, 27 percent, or most preferably no more than 25 percent lower than the average Mv of the composition. For purposes of this invention, the amount which the lowest temperature peak is lower than the average Mv for the composition can be determined according to the equation: ((Average Mv−Mv for lowest temperature peak)/Average Mv)*100.

The composition also preferably has an Mw as measured by Gel Permeation Chromatography (GPC) which is higher than the Mv for the lower temperature peak in the ATREF-DV.

In still another aspect, the invention is a film layer made from a polymer composition, wherein the composition has a CRYSTAF-LS characterized by having a lowest temperature peak between 30° C. and 90° C., wherein the lowest temperature peak has an Mw which is at least 6 percent lower than the average Mw of the composition, more preferably at least 7 percent, 8 percent, 9 percent, 10 percent, 11 percent, 12 percent, 13 percent, 14 percent, or most preferably at least 15 percent lower than the average Mw for the total composition. Preferably, the lowest temperature peak has an Mw which is no more than 40 percent lower than the average Mw of the composition, more preferably no more than 35 percent, 33 percent, 31 percent, 29 percent, 27 percent, or most preferably no more than 25 percent lower than the average Mw of the composition. For purposes of this invention, the amount which the lowest temperature peak is lower than the average Mw for the composition can be determined according to the equation: ((Average Mw−Mw for lowest temperature peak)/Average Mw)*100.

The invention is also an improvement in a composition comprising at least one homogeneously branched ethylene/alpha-olefin interpolymer and at least other ethylene polymer, preferably at least one heterogeneously branched ethylene/alpha-olefin interpolymer, the improvement comprising the composition having a CRYSTAF-LS characterized by having at least 1 low temperature peak between 30° C. and 90° C., wherein the lowest temperature peak has an Mw lower than the average Mw of the composition.

The Homogeneously Branched Ethylene Polymer

Figure 1:
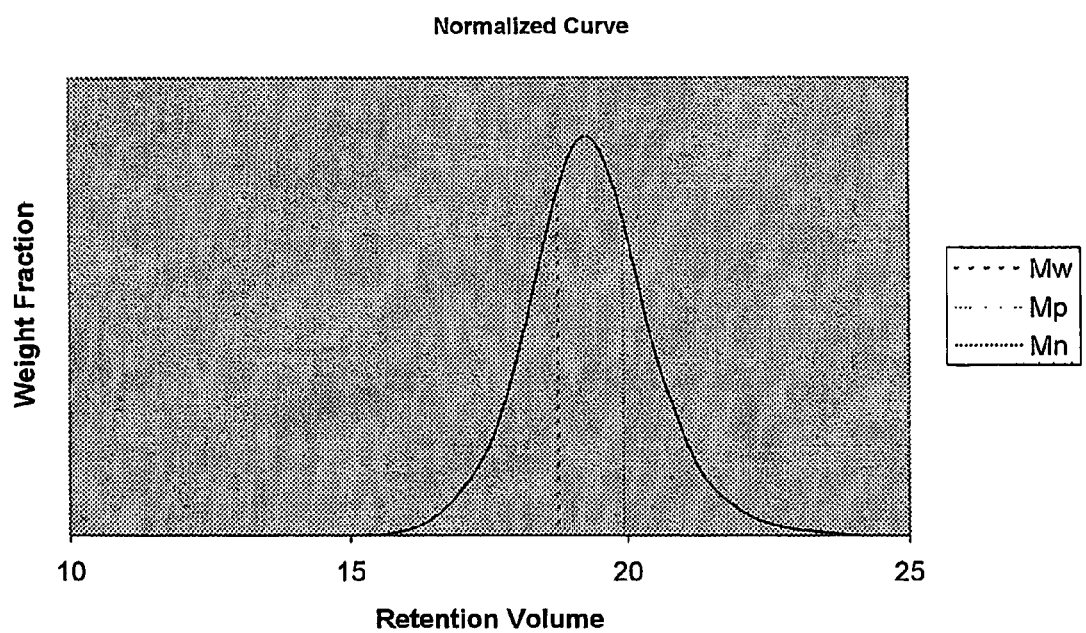
FIG. 1 shows the gel permeation chromatography (GPC) curve for Example 1.

The homogeneously branched ethylene/alpha-olefin interpolymer can be linear or substantially linear. It is preferably a homogeneously branched substantially linear ethylene/alpha-olefin interpolymer as described in U.S. Pat. No. 5,272,236. The homogeneously branched ethylene/alpha-olefin interpolymer can also be a linear ethylene/alpha-olefin interpolymer as described in U.S. Pat. No. 3,645,992.

The substantially linear ethylene/alpha-olefin interpolymers are not "linear" polymers in the traditional sense of the term, as used to describe linear low density polyethylene (for example, Ziegler polymerized linear low density polyethylene (LLDPE)), nor are they highly branched polymers, as used to describe low density polyethylene (LDPE). The substantially linear ethylene/alpha-olefin interpolymers of the present invention are herein defined as in U.S. Pat. No. 5,272,236 and in U.S. Pat. No. 5,278,272, which is also hereby incorporated by reference in its entirety.

The homogeneously branched ethylene/alpha-olefin interpolymers useful for forming the compositions described herein are those in which the comonomer is randomly distributed within a given interpolymer molecule and wherein substantially all of the interpolymer molecules have the same ethylene/comonomer ratio within that interpolymer. The homogeneity of the interpolymers is typically described by the SCBDI (Short Chain Branch Distribution Index) or CDBI (Composition Distribution Branch Index) and is defined as the weight percent of the polymer molecules having a comonomer content within 50 percent of the median total molar comonomer content. The CDBI of a polymer is readily calculated from data obtained from techniques known in the art, such as, for example, analytical temperature rising elution fractionation (abbreviated herein as "ATREF") as described, for example, in Wild et al, Journal of Polymer Science, Poly. Phys. Ed., Vol. 20, p. 441 (1982), in U.S. Pat. No. 4,798,081 (Hazlitt et al.), or in U.S. Pat. No. 5,089,321 (Chum et al.). The SCBDI or CDBI for the linear and for the substantially linear olefin polymers of the present invention is preferably greater than 30 percent, especially greater than 50 percent. The homogeneous ethylene/alpha-olefin polymers used in this invention essentially lack a measurable "high density" fraction as measured by the TREF technique (that is, the homogeneously branched ethylene/alpha-olefin polymers do not contain a polymer fraction with a degree of branching less than or equal to 2 methyls/1000 carbons).

The substantially linear ethylene/alpha-olefin interpolymers for use in the present invention typically are interpolymers of ethylene with at least one $C_3$-$C_{20}$ alpha-olefin and/or $C_4$-$C_{18}$ diolefins. Copolymers of ethylene and 1-octene are especially preferred.

The term "interpolymer" is used herein to indicate a copolymer, or a terpolymer, or the like. That is, at least one other comonomer is polymerized with ethylene to make the interpolymer. Ethylene copolymerized with two or more comonomers can also be used to make the homogeneously branched substantially linear interpolymers useful in this invention. Preferred comonomers include the $C_3$-$C_{20}$ alpha-olefins, especially propene, isobutylene, 1-butene, 1-hexene, 4-methyl-1-pentene, 1-heptene, 1-octene, 1-nonene, and 1-decene, more preferably 1-butene, 1-hexene, 4-methyl-1-pentene and 1-octene.

The term "linear ethylene/alpha-olefin interpolymer" means that the interpolymer does not have long chain branching. That is, the linear ethylene/alpha-olefin interpolymer has an absence of long chain branching, as for example the linear low density polyethylene polymers or linear high density polyethylene polymers made using uniform (that is, homogeneous) branching distribution polymerization processes (for example, as described in U.S. Pat. No. 3,645,992 (Elston)) and are those in which the comonomer is randomly distributed within a given interpolymer molecule and wherein substantially all of the interpolymer molecules have the same ethylene/comonomer ratio within that interpolymer. The term "linear ethylene/alpha-olefin interpolymer" does not refer to high pressure branched (free-radical polymerized) polyethylene which is known to those skilled in the art to have numerous long chain branches. The branching distribution of the homogeneously branched linear ethylene/alpha-olefin interpolymers is the same or substantially the same as that described for the homogeneously branched substantially linear ethylene/alpha-olefin interpolymers, with the exception that the linear ethylene/alpha-olefin interpolymers do not have any long chain branching. The homogeneously branched linear ethylene/alpha-olefin interpolymers comprise ethylene with at least one $C_3$-$C_{20}$ alpha-olefin and/or $C_4$-$C_{18}$ diolefin. Copolymers of ethylene and 1-octene are especially preferred. Preferred comonomers include the $C_3$-$C_{20}$ alpha-olefins, especially propene, isobutylene, 1-butene, 1-pentene, 1-hexene, 4-methyl-1-pentene, 1-heptene, 1-octene, 1-nonene, and 1-decene, more preferably 1-butene, 1-hexene, 4-methyl-1-pentene and 1-octene.

Both the homogeneously branched substantially linear and the homogeneously branched linear ethylene/alpha-olefin interpolymers can have a single melting point, as opposed to traditional heterogeneously branched Ziegler polymerized ethylene/alpha-olefin copolymers having two or more melting points, as determined using differential scanning calorimetry (DSC).

The density of the homogeneously branched ethylene/alpha-olefin interpolymers (as measured in accordance with ASTM D-792) for use in component (A) of the present invention is generally from 0.86 g/cm$^3$ to 0.92 g/cm$^3$, preferably from 0.88 g/cm$^3$ to 0.915 g/cm$^3$, and especially from 0.89 g/cm$^3$ to less than 0.91 g/cm$^3$. When used as component (B) in the present invention, the density is generally from 0.88 g/cm$^3$ to 0.945 g/cm$^3$.

The amount of the homogeneously branched linear or substantially linear ethylene/alpha-olefin polymer incorporated into the composition varies depending upon the higher melt index (preferably heterogeneously branched) ethylene polymer to which it is combined.

The molecular weight of the homogeneously branched ethylene/alpha-olefin interpolymers for use in the present invention is conveniently indicated using a melt index measurement according to ASTM D-1238, Condition 190 C/2.16 kg (formerly known as "Condition (E)" and also known as I$_2$). Melt index is inversely proportional to the molecular weight of the polymer. Thus, the higher the molecular weight, the lower the melt index, although the relationship is not linear. The melt index limit for the homogeneously branched linear or substantially linear ethylene/alpha-olefin interpolymers for use in Component (A) is from 200 g/10 min, preferably 10 g/10 min, and can be as low as 0.2 g/10 min, preferably as low as 1 g/10 min.

Another measurement useful in characterizing the molecular weight of the homogeneously branched linear or substantially linear ethylene/alpha-olefin interpolymers is conveniently indicated using a melt index measurement according to ASTM D-1238, Condition 190 C/10 kg (formerly known as "Condition (N)" and also known as I$_{10}$). The ratio of the I$_{10}$ and I$_2$ melt index terms is the melt flow ratio and is designated as I$_{10}$/I$_2$. Generally, the I$_{10}$/I$_2$ ratio for the homogeneously branched linear ethylene/alpha-olefin interpolymers is greater than 5.6. For the homogeneously branched substantially linear ethylene/alpha-olefin interpolymers used in the compositions of the invention, the I$_{10}$/I$_2$ ratio indicates the degree of long chain branching, that is, the higher the I$_{10}$/I$_2$ ratio, the more long chain branching in the interpolymer. For the homogeneously branched substantially linear ethylene/alpha-olefin interpolymers, the higher the I$_{10}$/I$_2$ ratio, the better the processability that is typically observed.

Other additives such as antioxidants (for example, hindered phenolics (e.g., Irganox. 1010 made by Ciba Geigy Corp.), phosphites (for example, Irgafos® 168 also made by Ciba Geigy Corp.)), cling additives (for example, PIB), anti-block additives, pigments, fillers can also be included in the formulations, to the extent that they do not interfere with the enhanced formulation properties discovered by Applicants.

CRYSTAF Light Scattering Viscometry Method

Weight average molecular weight and intrinsic viscosity estimates as a function of short chain branching distribution were determined by three dimensional crystallization analysis fractionation (3D CRYSTAF) using a custom built CRYSTAF Light Scattering/Viscometry instrument provided by Polymer Char, Spain.

Figure 12:
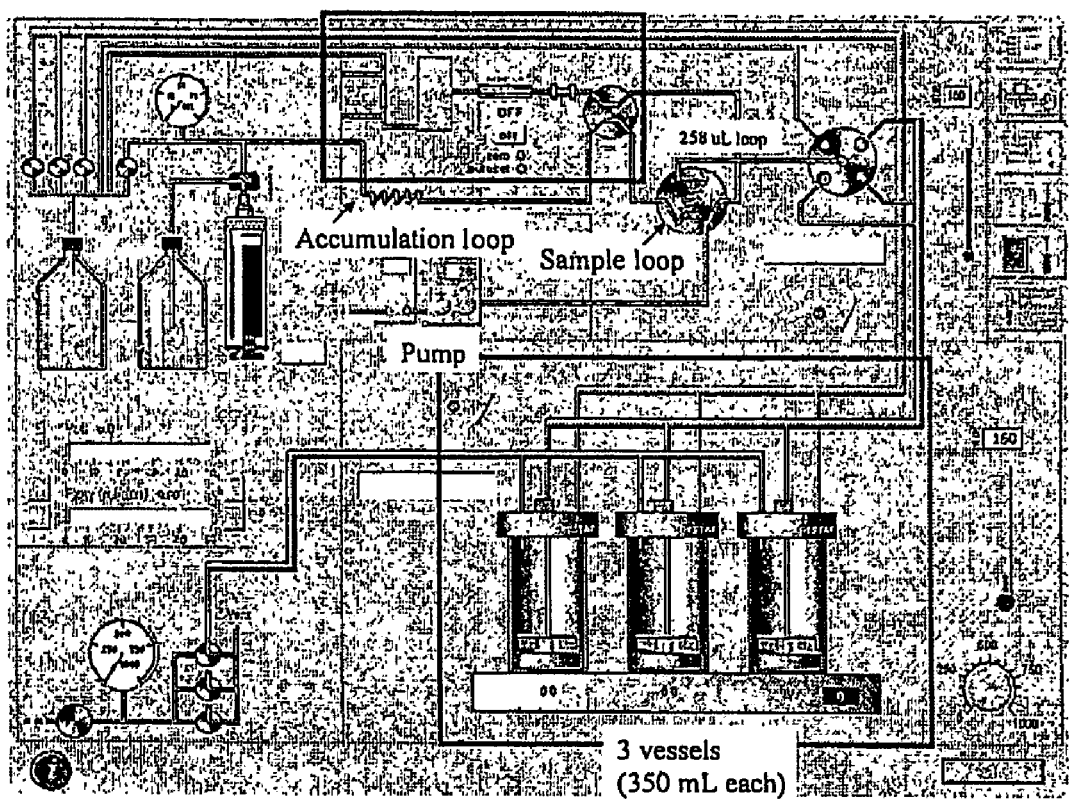
FIG. 12 is a schematic of a suitable CRYSTAF Light Scattering/Viscometry instrument.

The polymer samples were dissolved at 1.5 mg/mL concentration in 1,2,4 trichlorobenzene at 160° C. for 2 hr and then cooled to 95° C. and stabilized for 45 min before beginning the analysis. The sampling temperatures ranged from 95° C. to 30° C. at a cooling rate of 0.1° C./min. During the cooling step, the crystallized polymer precipitates, thus decreasing the polymer concentration in solution. The automated sampling measurements are made from the vessels in the temperature controlled oven by injecting 250 μL filtered aliquots through a heated oven (kept at 160° C.) containing a GPC-like system equipped with a 10 μm precolumn (PL Laboratories), a Precision Detectors light scattering unit, Polymer Char infra red concentration unit, and a home-built 4 capillary viscometer. A suitable system is depicted in FIG. 12. Each injection produces a respective concentration, light scattering, and viscometer chromatogram operated at a 1 mL/min flowrate.

During the entire analysis, 25-30 individual points are measured throughout the crystallization process. Peak height or area integration of each chromatogram results in a concentration, light scattering, and viscometer response for each sampled point.

Prior to the analysis, the detector system is calibrated with a linear polymer standard with known concentration, molecular weight, and intrinsic viscosity to obtain the individual detector calibration constants. The actual sample concentration is then calculated in reference to the calibrated peak heights or integrated areas of the concentration detector. The molecular weights and intrinsic viscosities are calculated by the ratio of the light scattering or viscometer height or area and then corrected by their respective calibration constants to obtain absolute molecular weight and intrinsic viscosities.

Figure 13:
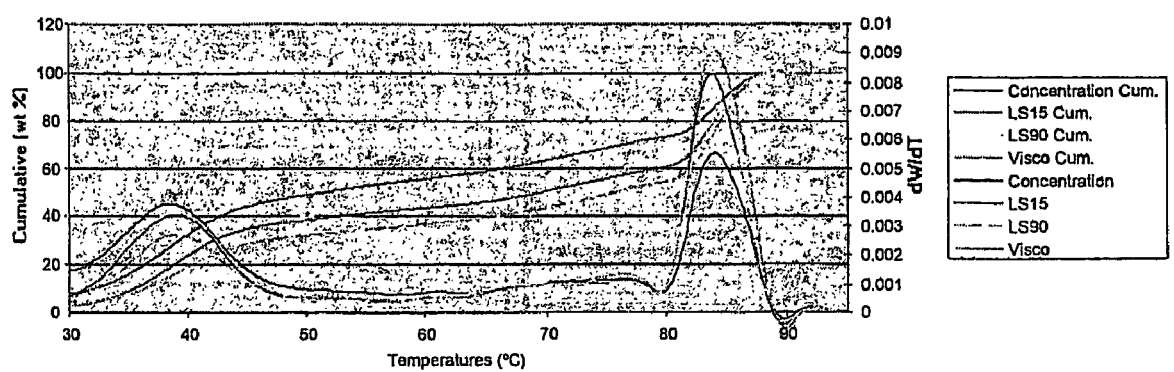
FIG. 13 shows a plot of a CRYSTAFLS Multidetector Profile.
Figure 14:
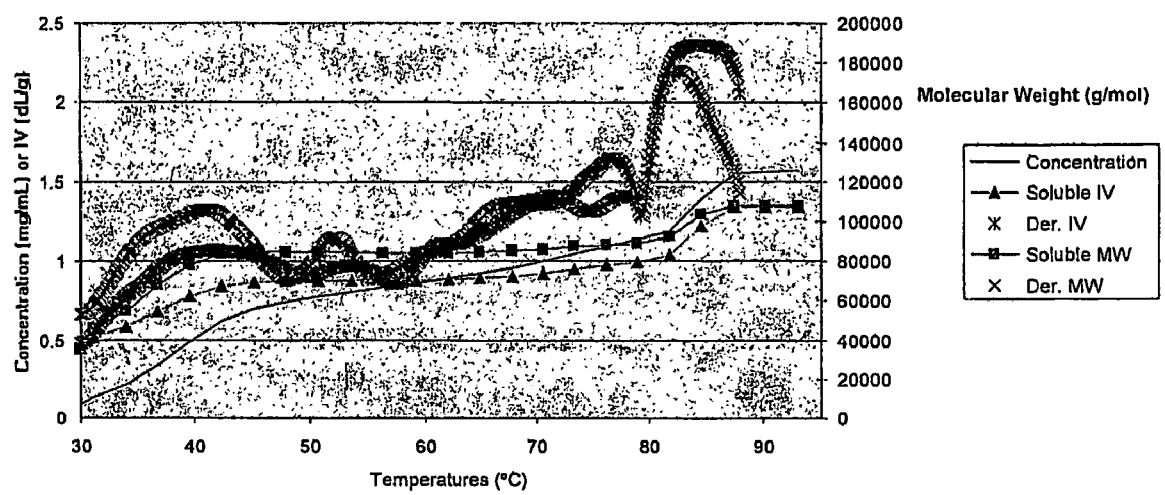
FIG. 14 shows a plot from CRYTAFLS of the Measured and Estimated Molecular Weight and Intrinsic Viscosity.

The collected concentration, molecular weight, and intrinsic viscosity data such as displayed in FIG. 13 represent the cumulative profile of the solubilized polymer remaining after crystallization. The first derivative of these cumulative distributions gives the concentration, molecular weight, and intrinsic viscosity distribution of crystallized polymer as a function of crystallization temperature, such as displayed in FIG. 14. The resulting profiles are interpreted as the polymer's molecular weight and intrinsic viscosity values as a function of its short chain branching distribution.

Molecular Weight Distribution Determination

The molecular weight distributions of polyolefin, particularly ethylene, polymers are determined by gel permeation chromatography (GPC) on a Waters 150 C high temperature chromatographic unit equipped with a differential refractometer and three columns of mixed porosity. The columns are supplied by Polymer Laboratories and are commonly packed with pore sizes of 103, 104, 105 and 106 Å. The solvent is 1,2,4-trichlorobenzene, from which 0.3 percent by weight solutions of the samples are prepared for injection. The flow rate is 1.0 milliliters/minute, unit operating temperature is 140° C. and the injection size is 100 microliters.

The molecular weight determination with respect to the polymer backbone is deduced by using narrow molecular weight distribution polystyrene standards (from Polymer Laboratories) in conjunction with their elution volumes. The equivalent polyethylene molecular weights are determined by using appropriate Mark-Houwink coefficients for polyethylene and polystyrene (as described by Williams and Ward in *Journal of Polymer Science*, Polymer Letters, Vol. 6, p. 621, 1968:

$$M_{polyethylene} = a * (M_{polystyrene})b.$$

In this equation, a=0.4316 and b=1.0. Weight average molecular weight, Mw, is calculated in the usual manner according to the following formula: $Mj = (\Sigma w_i(M_i^j))^j$. Where $w_i$ is the weight fraction of the molecules with molecular weight $M_i$ eluting from the GPC column in fraction i and j=1 when calculating $M_w$ and j=−1 when calculating $M_n$.

For the homogeneously branched ethylene/alpha-olefin polymers, including both the linear and substantially linear ethylene/alpha-olefin polymers, the molecular weight distribution (Mw/Mn) is preferably from 1.8 to 2.8, more preferably from 1.89 to 2.2 and especially 2.

The Heterogeneously Branched Ethylene Polymer

The ethylene polymer to be combined with the homogeneous ethylene/alpha-olefin interpolymer of component (A) has a density of from 0.88 g/cm3 to 0.945 g/cm3, and has a melt index which is lower than that of Component (A). While this component (B) can be another homogeneous ethylene/alpha-olefin interpolymer, it is preferably a heterogeneously branched (for example, Ziegler polymerized) interpolymer of ethylene with at least one C3-C20 alpha-olefin (for example, linear low density polyethylene (LLDPE)).

Heterogeneously branched ethylene/alpha-olefin interpolymers differ from the homogeneously branched ethylene/alpha-olefin interpolymers primarily in their branching distribution. For example, heterogeneously branched LLDPE polymers have a distribution of branching, including a highly branched portion (similar to a very low density polyethylene), a medium branched portion (similar to a medium branched polyethylene) and an essentially linear portion (similar to linear homopolymer polyethylene). The heterogeneously branched ethylene polymer can be made using the techniques of U.S. Pat. No. 4,076,698 (Anderson et al.).

The amount of each of these fractions can be varied depending upon the whole polymer properties desired. For example, linear homopolymer polyethylene has neither branched nor highly branched fractions, but is linear. A very low density heterogeneous polyethylene having a density from 0.9 g/cm3 to 0.915 g/cm3 (such as ATTANE* copolymers, sold by The Dow Chemical Company and FLEXOMER* sold by Union Carbide Corporation) has a higher percentage of the highly short chain branched fraction, thus lowering the density of the whole polymer. Heterogeneously branched LLDPE (such as DOWLEX sold by The Dow Chemical Company) has a lower amount of the highly branched fraction, but has a greater amount of the medium branched fraction.

More preferably, the heterogeneously branched ethylene polymer is a copolymer of ethylene with a $C_3$-$C_{20}$ alpha-olefin, wherein the copolymer has: (i) a density from 0.88 g/cm$^3$ to 0.945 g/cm$^3$, and (ii) a melt index ($I_2$) from 0.01 g/10 m into 50 g/10 min.

The preferably heterogeneously branched ethylene polymer chosen for use in component (B) of the compositions of the present invention, should be such that the polymer composition has a melt index lower than the melt index of homogeneously branched portion of component (A).

The Formulated Compositions

The compositions disclosed herein can be formed by any convenient method, including dry blending the individual components and subsequently melt mixing or by pre-melt mixing in a separate extruder (e.g., a Banbury mixer, a Haake mixer, a Brabender internal mixer, or a twin screw extruder).

U.S. Pat. No. 5,844,045, U.S. Pat. No. 5,869,575 and U.S. Pat. No. 6,448,341, describes, inter alia, interpolymerizations of ethylene and C3-C20 alpha-olefins using a homogeneous catalyst in at least one reactor and a heterogeneous catalyst in at least one other reactor. The reactors can be operated sequentially or in parallel.

U.S. Pat. No. 6,538,070, U.S. Pat. No. 6,566,446, and U.S. Pat. No. 6,545,088, describes, inter alia, interpolymerizations of ethylene and C3-C20 alpha-olefins using a homogeneous catalyst in at least one reactor and another homogeneous catalyst in at least one other reactor. The reactors can be operated sequentially or in parallel.

The compositions can also be made by fractionating a heterogeneous ethylene/alpha-olefin polymer into specific polymer fractions with each fraction having a narrow composition (that is, branching) distribution, selecting the fraction having the specified properties, and blending the selected fraction in the appropriate amounts with another ethylene polymer. This method is obviously not as economical as the in-situ interpolymerizations of U.S. Pat. No. 5,844,045, U.S. Pat. No. 5,869,575 and U.S. Pat. No. 6,448,341, but can be used to obtain the compositions of the invention.

Fabricated Articles Made from the Novel Compositions

Many useful fabricated articles benefit from the novel compositions disclosed herein. For example, molding operations can be used to form useful fabricated articles or parts from the compositions disclosed herein, including various injection molding processes (for example, that described in Modern Plastics Encyclopedia/89, Mid October 1988 Issue, Volume 65, Number 11, pp. 264-268, "Introduction to Injection Molding" by H. Randall Parker and on pp. 270-271, "Injection Molding Thermoplastics" by Michael W. Green, blow molding processes (for example, that described in Modern Plastics Encyclopedia/89, Mid October 1988 Issue, Volume 65, Number 11, pp. 217-218, "Extrusion-Blow Molding" by Christopher Irwin), profile extrusion, calandering, pultrusion (for example, pipes). Rotomolded articles can also benefit from the novel compositions described herein. Rotomolding techniques are well known to those skilled in the art and include, for example, those described in Modern Plastics Encyclopedia/89, Mid October 1988 Issue, Volume 65, Number 11, pp. 296-301, "Rotational Molding" by R. L. Fair).

Fibers (such as, staple fibers, melt blown fibers or spun-bonded fibers (using, for example, systems as disclosed in U.S. Pat. No. 4,340,563, 4,663,220, 4,668,566, or 4,322,027), and gel spun fibers (for example, the system disclosed in U.S. Pat. No. 4,413,110)), both woven and nonwoven fabrics (for example, spunlaced fabrics disclosed in U.S. Pat. No. 3,485,706) or structures made from such fibers (including, blends of these fibers with other fibers, such as PET or cotton)) can also be made from the novel compositions disclosed herein.

Film and film structures particularly benefit from the novel compositions described herein and can be made using conventional hot blown film fabrication techniques or other biaxial orientation processes such as tenter frames or double bubble processes. Conventional hot blown film processes are described, for example, in The Encyclopedia of Chemical Technology, Kirk-Othmer, Third Edition, John Wiley & Sons, New York, 1981, Vol. 16, pp. 416-417 and Vol. 18, pp. 191-192. Biaxial orientation film manufacturing process such as described in a "double bubble" process as in U.S. Pat. No. 3,456,044 (Pahlke), and the processes described in U.S. Pat. No. 4,352,849 (Mueller), U.S. Pat. No. 4,597,920 (Golike), U.S. Pat. No. 4,820,557 (Warren), U.S. Pat. No. 4,837,084 (Warren), U.S. Pat. No. 4,865,902 (Golike et al.), U.S. Pat. No. 4,927,708 (Herran et al.), U.S. Pat. No. 4,952,451 (Mueller), U.S. Pat. No. 4,963,419 (Lustig et al.), and U.S. Pat. No. 5,059,481 (Lustig et al.), can also be used to make film structures from the novel compositions described herein. The film structures can also be made as described in a tenter-frame technique, such as that used for oriented polypropylene.

Other multi-layer film manufacturing techniques for food packaging applications are described in Packaging Foods With Plastics, by Wilmer A. Jenkins and James P. Harrington (1991), pp. 19-27, and in "Coextrusion Basics" by Thomas I. Butler, Film Extrusion Manual: Process, Materials, Properties pp. 31-80 (published by TAPPI Press (1992)).

The films may be monolayer or multilayer films. The film made from the novel compositions can also be coextruded with the other layer(s) or the film can be laminated onto another layer(s) in a secondary operation, such as that described in Packaging Foods With Plastics, by Wilmer A. Jenkins and James P. Harrington (1991) or that described in "Coextrusion For Barrier Packaging" by W. J. Schrenk and C. R. Finch, Society of Plastics Engineers RETEC Proceedings, Jun. 15-17 (1981), pp. 211-229. If a monolayer film is produced via tubular film (blown film techniques) or flat die (cast film) as described by K. R. Osborn and W. A. Jenkins in "Plastic Films, Technology and Packaging Applications" (Technomic Publishing Co., Inc. (1992)), then the film may go through an additional post-extrusion step of adhesive or extrusion lamination to other packaging material layers to form a multilayer structure. If the film is a coextrusion of two or more layers (also described by Osborn and Jenkins), the film may still be laminated to additional layers of packaging materials, depending on the other physical requirements of the final film. "Laminations Vs. Coextrusion" by D. Dumbleton (Converting Magazine (September 1992), also discusses lamination versus coextrusion. Monolayer and coextruded films can also go through other post extrusion techniques, such as a biaxial orientation process.

Extrusion coating is yet another technique for producing multilayer film structures using the novel compositions described herein. The novel compositions comprise at least one layer of the film structure. Similar to cast film, extrusion coating is a flat die technique. A sealant can be extrusion coated onto a substrate either in the form of a monolayer or a coextruded extrudate.

The films and film layers of this invention are especially useful in vertical-form-fill-seal (VFFS) applications. Patents describing improvements for VFFS applications, especially polymer improvements, include U.S. Pat. No. 5,228,531; U.S. Pat. No. 5,360,648; U.S. Pat. No. 5,364,486; U.S. Pat. No. 5,721,025; U.S. Pat. No. 5,879,768; U.S. Pat. No. 5,942, 579; U.S. Pat. No. 6,117,465. Generally for a multilayer film structure, the novel compositions described herein comprise at least one layer of the total multilayer film structure. Other layers of the multilayer structure include but are not limited to barrier layers, and/or tie layers, and/or structural layers. Various materials can be used for these layers, with some of them being used as more than one layer in the same film structure. Some of these materials include: foil, nylon, ethylene/vinyl alcohol (EVOH) copolymers, polyvinylidene chloride (PVDC), polyethylene terephthalate (PET), polypropylene, oriented polypropylene (OPP), ethylene/vinyl acetate (EVA) copolymers, ethylene/acrylic acid (EAA) copolymers, ethylene/methacrylic acid (EMAA) copolymers, LLDPE; HDPE, LDPE, nylon, graft adhesive polymers (for example, maleic anhydride grafted polyethylene), and paper. Generally, the multilayer film structures comprise from 2 to 7 layers.

EXAMPLES

Example 1

Figure 2:
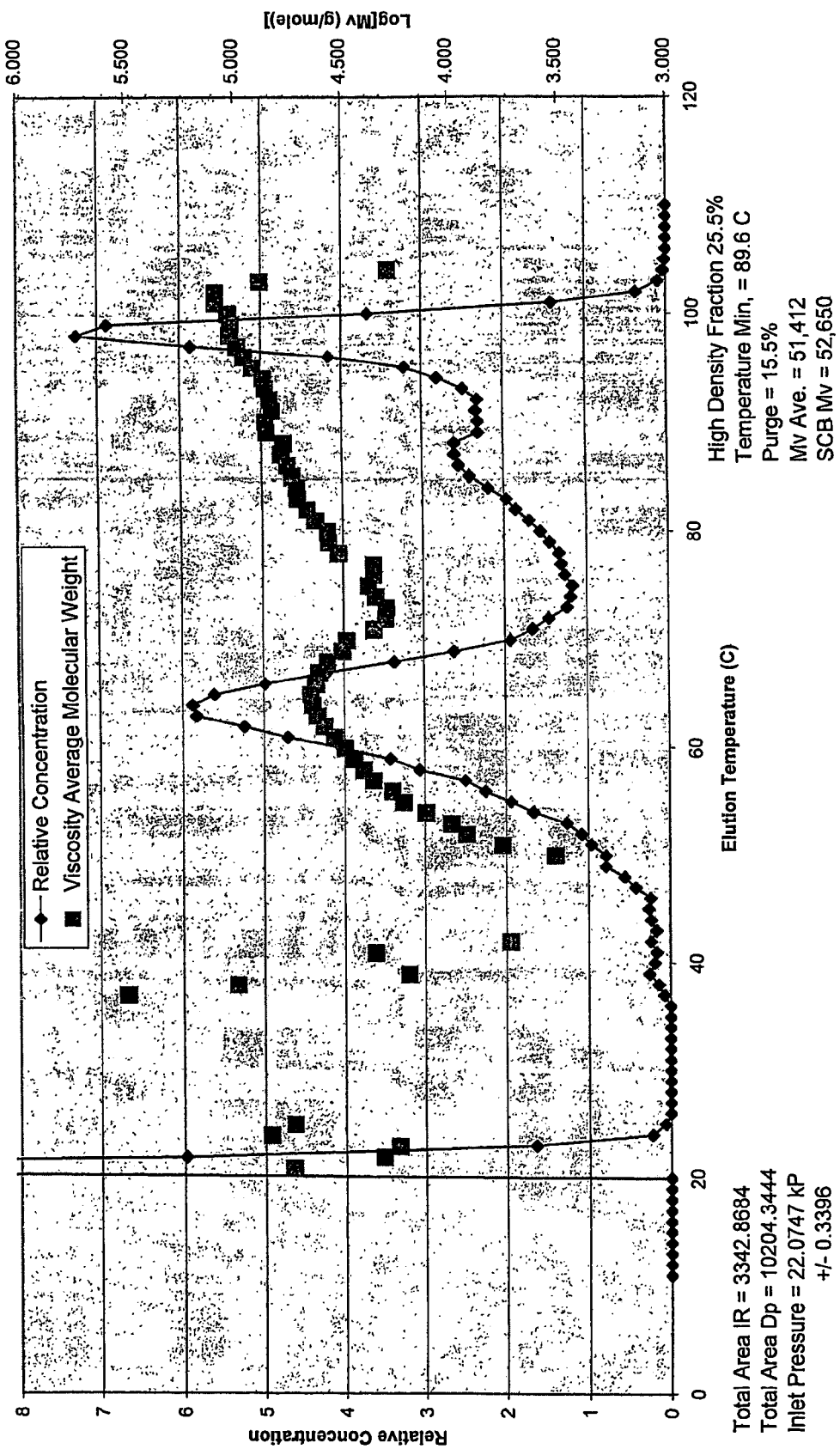
FIG. 2 shows the short chain branching distribution (as measured by analytical temperature rising elution fractionation equipped with a differential viscometer (ATREF-DV)) for Example 1.

Example 1 was an in-situ blend made according to U.S. Pat. No. 5,844,045, U.S. Pat. No. 5,869,575 and U.S. Pat. No. 6,448,341, wherein the homogeneously branched polymer was made in a first reactor and was an ethylene/1-octene copolymer having a melt index ($I_2$) of 3.5 g/10 min., and a density of 0.895 g/cm$^3$, a melt flow ratio ($I_{10}/I_2$) of 6.5 and a molecular weight distribution (Mw/Mn) of 2.1 and comprises 47 percent (by weight of the total composition). A heterogeneously branched ethylene/1-octene copolymer was made in a second reactor operated sequentially with the first reactor and has a melt index ($I_2$) of 0.8 g/10 min., and a density of 0.925 g/cm$^3$ and comprises the remaining 53 percent (by weight of the total composition). The total composition has a melt index ($I_2$) of 1.5 g/10 min, a density of 0.914 g/cm$^3$, a melt flow ratio ($I_{10}/I_2$) of 7.3 and a molecular weight distribution (Mw/Mn) of 2.89. FIG. 1 shows the gel permeation chromatography (GPC) curve for this Example and FIG. 2 shows the short chain branching distribution (as measured by analytical temperature rising elution fractionation equipped with a differential viscometer (ATREF-DV)). This composition was used as the sealant and made into monolayer blown film as described in Table 1. The resultant monolayer film properties were reported in Table 3. The composition of Example 1 was blended with slip and antiblock and used as the sealant in the coextruded blown film as described in Table 2. The use of slip and antiblock additives were well-known in the art. For these examples, the slip additive was from 1000-1500 ppm erucamide or from 0-500 ppm stearamide. The antiblock additive used was from 2500-3000 ppm SiO2, or from 0-700 ppm Fluoroelastomer Polymer process aid.

Comparative Example 2

Figure 3:
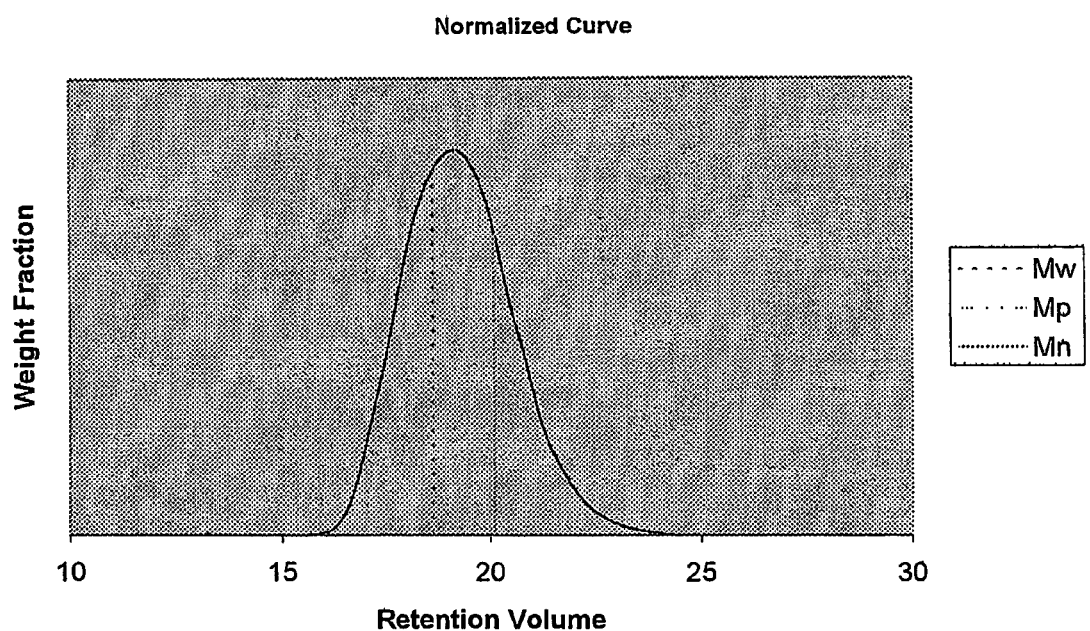
FIG. 3 shows the gel permeation chromatography (GPC) curve for Comparative Example 2.
Figure 4:
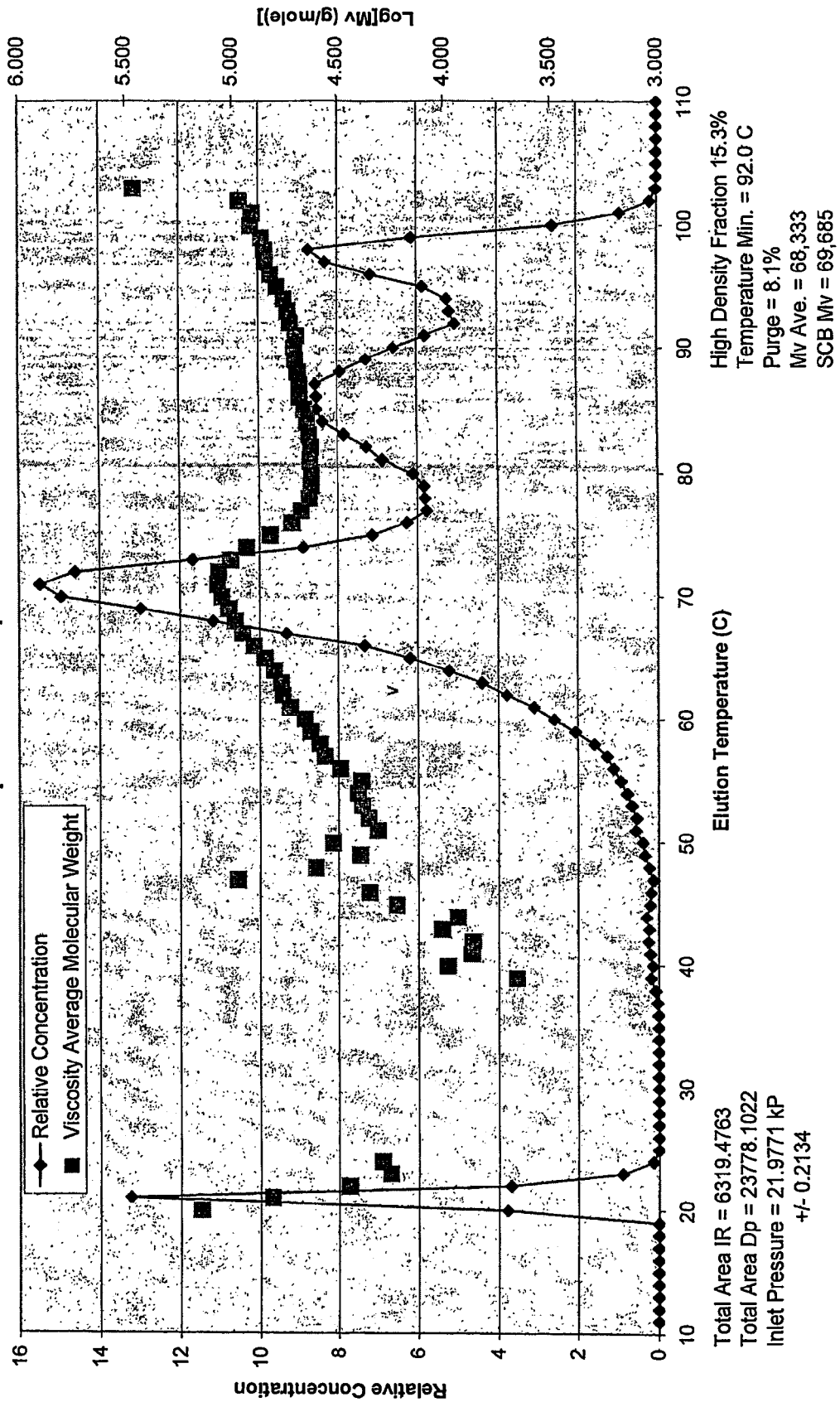
FIG. 4 shows the short chain branching distribution (as measured by analytical temperature rising elution fractionation equipped with a differential viscometer (ATREF-DV)) for Comparative Example 2.

Comparative Example 2 was an in-situ blend made according to U.S. Pat. No. 5,844,045, U.S. Pat. No. 5,869,575 and U.S. Pat. No. 6,448,341, wherein the homogeneously branched polymer was made in a first reactor and was an ethylene/1-octene copolymer having a melt index ($I_2$) of 0.27 g/10 min., and a density of 0.902 g/cm$^3$, and a molecular weight distribution (Mw/Mn) of 2 and comprises 38.5 percent (by weight of the total composition). A heterogeneously branched ethylene/1-octene copolymer was made in a second reactor operated sequentially with the first reactor and has a melt index ($I_2$) of 1.7 g/10 min., and a density of 0.925 g/cm$^3$ and comprises the remaining 61.5 percent (by weight of the total composition). The total composition has a melt index ($I_2$) of 1 g/10 min, a density of 0.916 g/cm$^3$, a melt flow ratio ($I_{10}/I_2$) of 7.7 and a molecular weight distribution (Mw/Mn) of 3.8. FIG. 3 shows the gel permeation chromatography (GPC) curve for this Example and FIG. 4 shows the short chain branching distribution (as measured by analytical temperature rising elution fractionation equipped with a differential viscometer (ATREF-DV)). This composition was used as the sealant and made into monolayer blown film as described in Table 1 and coextruded blown film as described in Table 2. The resultant monolayer film properties were reported in Table 3.

Table 3 also contains data from films made with unblended Polymer B and EXCEED 1012CA for comparison purposes. Polymer B was a heterogeneously branched ethylene/1-octene copolymer having a melt index ($I_2$) of 1 gram/10 minutes and a density of 0.92 grams/cubic centimeter. EXCEED 1012 CA was an ethylene/1-hexene copolymer made in the gas phase using a metallocene catalyst and has a melt index ($I_2$) of 1 gram/10 minutes and a density of 0.912 grams/cubic centimeter.

The film properties reported in Table 3 were measured as follows. Dart impact (type B) of the films was measured in accordance with ASTM D-1709-85; tensile strength, yield, toughness, and 2 percent secant modulus of the films was measured in accordance with ASTM D-882; Elmendorf tear (type B) was measured in accordance with ASTM D-1922.

Puncture was measured by using an Instron tensiometer Tensile Tester with an integrator, a specimen holder that holds the film sample taut across a circular opening, and a rod-like puncturing device with a rounded tip (ball) which was attached to the cross-head of the Instron and impinges perpendicularly onto the film sample. The Instron was set to obtain a crosshead speed of 10 inches/minute and a chart speed (if used) of 10 inches/minute. Load range of 50 percent of the load cell capacity (100 lb. Load for these tests) should be used. The puncturing device was installed to the Instron such that the clamping unit was attached to the lower mount and the ball was attached to the upper mount on the crosshead. Six film specimens were used (each 6 inches square). The specimen was clamped in the film holder and the film holder was secured to the mounting bracket. The crosshead travel was set and continues until the specimen breaks. Puncture resistance was defined as the energy to puncture divided by the volume of the film under test. Puncture resistance (PR) was calculated as follows: $PR=E/((12)(T)(A))$; where PR=puncture resistance (ft-lbs/in$^3$); E=energy (inch-lbs)= area under the load displacement curve; 12=inches/foot; T=film thickness (inches); and A=area of the film sample in the clamp=12.56 in$^2$.

In general, films made from the novel formulated ethylene/ alpha-olefin compositions exhibit good impact and tensile properties, and an especially good combination of optics and tear. Further, films from the example resins exhibited significant improvements over films made from the comparative resins in a number of key properties.

Figure 5:
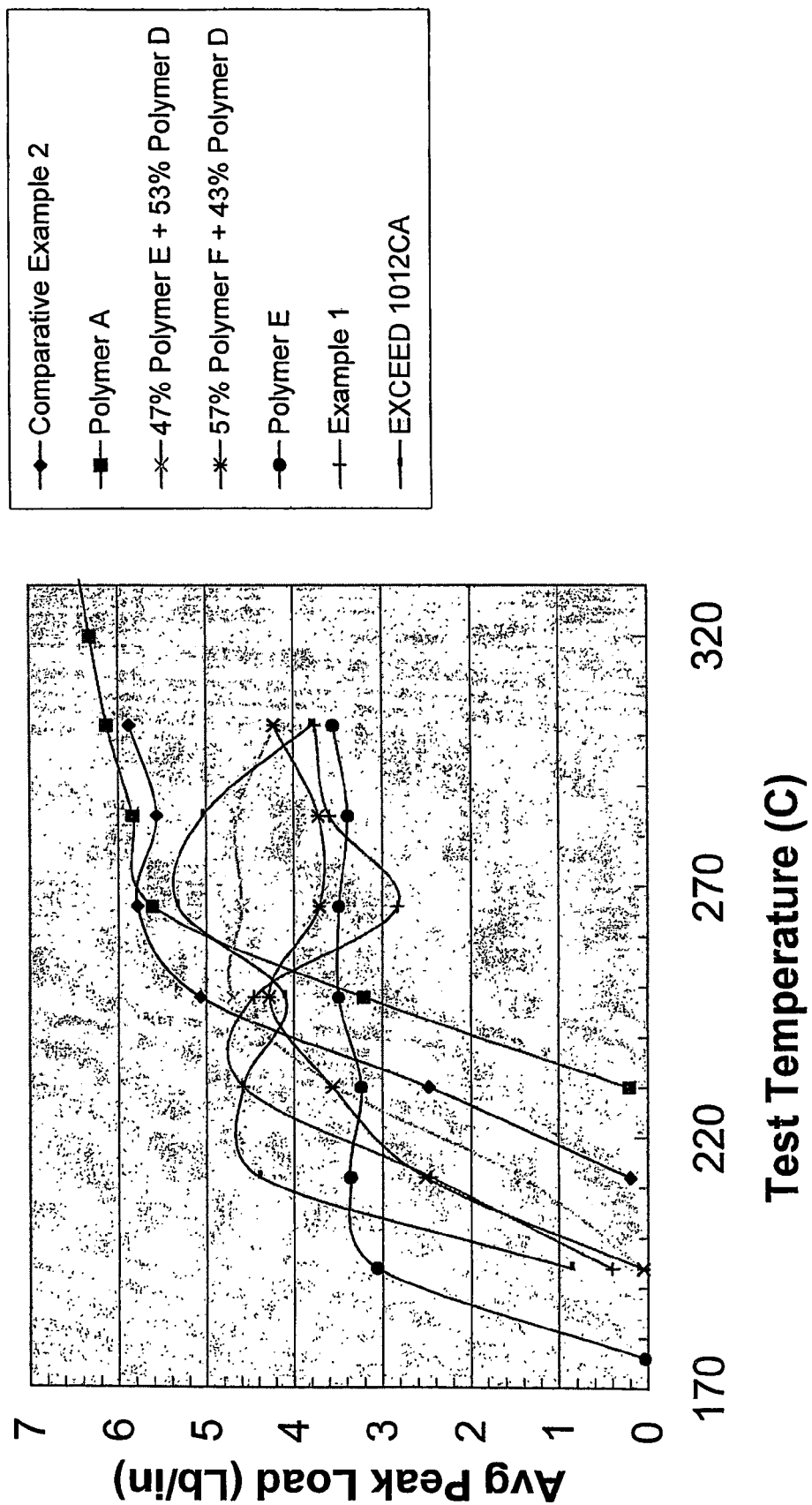
FIG. 5 shows heat seal data (average peak load versus temperature) for three layer film structures using various polymer compositions as the sealant layer.

Comparing example 1 to comparative example 2 (both made according to U.S. Pat. No. 5,844,045, U.S. Pat. No. 5,869,575 and U.S. Pat. No. 6,448,341,), the data depicted in FIG. 5 shows films produced from the inventive blend exhibited significantly lower heat seal initiation temperatures (10° C.) than film made from comparative example 2 (heat seal initiation temperature was generally measured as the temperature at which at least 1 pound of peak force was achieved.).

TABLE 1

Monolayer Blown Film Fabrication Conditions

| | |
|---|---|
| Blow Up Ratio | 2.5 |
| Frostline Height | 25 in |
| Die | 6 in Gloucester |
| Die Gap | 70 mil |
| Melt Temperature | 450° F. |
| Screw | Single Flight Double Mix |
| Rate | 6 lb/hr/in of die (120 lb/hr) |
| Gauge | 2 mil |
| Screen Pack | 20/40/60/80/20 |

TABLE 2

Coextruded Blown Film Fabrication Conditions

| | |
|---|---|
| Layer components | Layer 1: Polymer A/Layer 2: 75 percent Polymer A + 25 percent Polymer C/Layer 3 (sealant layer) resin of Example 1 |
| Layer Ratios | 0.5 mil/1.0 mil/1.0 mil |
| Blow up ratio | 2.5 |
| Die | 8 in Coex |
| Die Gap | 70 mil |
| Melt Temperature | Floats around 440-460° F. |
| Gauge | 2.5 mil |

TABLE 3

| Resin | Comparative Example 2 | Polymer B | Example 1 | EXCEED 1012CA |
|---|---|---|---|---|
| Resin Characteristics | | | | |
| I$_2$ (g/10 min) | 1 | 1 | 1.5 | 1 |
| Density (g/cc) | 0.916 | 0.92 | 0.914 | 0.912 |
| I$_{10}$/I$_2$ | 7.7 | — | 7.4 | — |
| Component A I$_2$ (g/10 min) | 0.27 | — | 3.5 | — |
| Component A Density (g/cc) | 0.902 | — | 0.896 | — |
| Wt Fraction of component A (percent) | 38.5 | — | 47 | — |
| Component B I$_2$ (g/10 min) | 1.7 | — | ~0.8 | — |
| Component B Density (g/cc) | 0.925 | — | ~0.930 | — |
| Fabrication Conditions (2.0 mil) | | | | |
| Screw Speed (rpm) | 54.6 | 56 | 53.2 | 54.7 |
| Output rate (lb/hr) | 120.1 | 120.1 | 120.1 | 120.1 |
| Percent FLC | 47.8 | 48.2 | 45.3 | 55.6 |
| Percent improvement in percent FLC for Ex. 1 | 5.2 | 6.0 | 0.0 | 18.5 |
| Horsepower | 14 | 15 | 13 | 17 |
| Backpressure - Screen (psi) | 4720 | 4810 | 3940 | 5780 |
| percent Improvement in Backpressure for Ex. 1 | 16.5 | 18.1 | 0.0 | 31.8 |
| Melt Temp (F.) | 450 | 450 | 450 | 450 |
| Layflat (in) | 23.5 | 23.5 | 23.5 | 23.5 |
| BUR | 2.5 | 2.5 | 2.5 | 2.5 |
| Frostline Height (in) | 25 | 25 | 25 | 25 |
| Die Gap (mil) | 70 | 70 | 70 | 70 |
| Physical Properties | | | | |
| Clarity | 98.68 | 99.28 | 99.47 | 94.65 |
| KiKinetic COF FM | 1.2 | 0.979 | 1.42 | 1.63 |
| Static COF FM | 1.29 | 1.16 | 1.6 | 1.89 |
| Kinetic COF II | | 1.14 | | |
| Static COF II | | 1.5 | | |
| Dart B (g) | 980 | 236 | 408 | >850 |
| Elmendorf Tear B CD (g) | 1095 | 1304 | 1354 | 647.1 |
| Normalized Elmendorf B CD (g/mil) | 525.3 | 628.4 | 641.9 | 315 |
| Elmendorf Tear B MD (g) | 807.4 | 965.9 | 1129 | 572 |
| Normalized Elmendorf B MD (g/mil) | 374.9 | 444.9 | 541.8 | 273.4 |
| Gloss 20 deg | 90.73 | 101.2 | 118.4 | 25.44 |
| Gloss 45 deg | 69.97 | 71.93 | 78.73 | 46.44 |
| Haze (percent) | 9.387 | 8.217 | 6.56 | 12.83 |
| Punct ELONG @ BREAK (In) | 6.94 | 6.08 | 6.9 | 7.46 |
| Punct ENERGY TO BREAK (In-Lb) | 92.976 | 70.692 | 80.996 | 107.252 |
| Punct PEAK LOAD (Lb) | 25.474 | 21.948 | 21.88 | 27.456 |
| PUNCTURE (Ft-Lb/Cu. In) | 317.18 | 237.52 | 263.84 | 353.66 |
| 1percent SECANT CD (PSI) | 32108.66 | 41579.48 | 34184.44 | 21482.12 |
| 2 percent SECANT CD (PSI) | 27427.08 | 34965.72 | 28730.32 | 19017.58 |
| 1 percent | 26138.68 | 34404.58 | 26626.78 | 20281.48 |

TABLE 3-continued

| Resin | Comparative Example 2 | Polymer B | Example 1 | EXCEED 1012CA |
|---|---|---|---|---|
| SECANT MD (PSI) 2 percent | 23217.76 | 29602.86 | 23427.8 | 18348.6 |
| SECANT MD (PSI) ELONGATION CD (percent) | 722.36 | 807.08 | 808.3 | 677.62 |
| Break Load CD (Lb) | 14.24 | 13.38 | 13.68 | 17.1 |
| TOUGHNESS CD (Ft-Lb/Cu. In) | 3263.63 | 3802.552 | 3731.702 | 3230.92 |
| ULTIMATE CD (PSI) | 7642.9 | 7078.6 | 7399.72 | 8706.94 |
| Yield Load CD (Lb) | 2.88 | 3.46 | 2.76 | 2.44 |
| YIELD STRENGTH CD (PSI) | 1543.22 | 1832.28 | 1490.64 | 1238 |
| ELONGATION MD (percent) | 647.76 | 728.1 | 779.8 | 647.04 |
| Break Load MD (Lb) | 15.58 | 15.84 | 16.38 | 19.88 |
| TOUGHNESS MD (Ft-Lb/Cu. In) | 3000.186 | 3740.974 | 3837.02 | 3407.738 |
| ULTIMATE MD (PSI) | 7687.74 | 8123.32 | 8154.78 | 10088.58 |
| Yield Load MD (Lb) | 3 | 3.42 | 2.86 | 2.52 |
| YIELD STRENGTH MD (PSI) | 1481.56 | 1746.22 | 1428.9 | 1275.9 |

As the data in the table shows, Example 1 has much better (lower) haze value than the other three comparatives, and also superior tear properties (Elmendorf Tear B CD (cross direction) of 1354 g for Example 1, but only 1095 g for Comparative Example 2; Elmendorf Tear B MD (machine direction) of 1129 g for Example 1, but only 807 g for Comparative Example 2).

The data in Table 4 shows vertical-form-fill-seal (VFFS) bag integrity tests performed in a tank of water having a vacuum placed on it after the VFFS structure was sealed and placed into the tank. The data represents percentage of VFFS bags structures not leaking. The data shows a 15° F. wider seal window for Example 1 versus Comparative Example 2.

Table 4: Results from seal integrity testing. Reported results were the percent of bags passing the seal integrity test (fish tank test). Where a sample which can be submersed in water in the tank without leaking air represents a passing sample. The seal integrity test tank was 2 feet wide by two feet long by two feet deep. No additional pressure (outside of atmospheric) was induced into the bag. Therefore, the bags contain some amount of air at atmospheric pressure after filling. Vertical seal temperature was set at an optimum temperature for each sample. Not all temperatures reported as 100 percent were actually tested (data was filled in for graphing purposes). Samples exhibited severe deformation of the end seals above 285 F. Bags were made at 25 bags per minute. Sample description for Table 4:

EXCEED 1012CA—melt index of 1.0 g/10 min., density of 0.912 g/cm$^3$ gas phase metallocene. Blended with slip and antiblock for COF control required in VFFS applications.

Comparative Example 2: As stated above, but blended with slip and antiblock for COF control required in VFFS applications.

Example 1: As stated above but blended with slip and antiblock for COF control required in VFFS applications.

Polymer A was Polymer B as described above with 1200 ppm slip and 3000 ppm antiblock. Polymers A and B and can be made according to U.S. Pat. No. 4,076,698 (Anderson et al.). Polymers A and B were heterogeneously branched ethylene/1-octene copolymers having a melt index ($I_2$) of 1 gram/10 minutes and a density of 0.92 grams/cubic centimeter.

Polymer D was a heterogeneously branched ethylene/1-octene copolymer having a melt index ($I_2$) of 0.85 gram/10 minutes and a density of 0.928 grams/cubic centimeter, blended with slip and antiblock and can be made according to U.S. Pat. No. 4,076,698 (Anderson et al.).

Polymer E was a substantially linear ethylene/1-octene copolymer having a melt index of 1 gm/10 minutes and a density of 0.904 g/cubic centimeter, and was stabilized with a phosite and a hindered phenolic. Polymer E was made in accordance with U.S. Pat. No. 5,272,236 and U.S. Pat. No. 5,278,272.

Polymer F was a substantially linear ethylene/1-octene copolymer having a melt index ($I_2$) of 3 grams/10 minutes and a density of 0.904 grams/cubic centimeter, and was stabilized with a phosite and a hindered phenolic. Polymer F was made in accordance with U.S. Pat. No. 5,272,236 and U.S. Pat. No. 5,278,272.

Comparative Example 3

A blend of 47 percent Polymer E and 53 percent Polymer D

Comparative Example 4

A blend of 57 percent Polymer F and 43 percent Polymer D

All of these resins were used as the sealant layer in the following structures:

First layer: 0.5 mil Polymer A/Second layer: 1.0 mil 75 percent Polymer A+25 percent Polymer C/third layer (sealant layer) 1.0 mil Polymer C was a modified propylene/ethylene copolymer (diphenyl oxide 4,4' bis-sulfonyl azide (150 ppm) modified impact copolymer ethylene (8-10 percent by weight)/polypropylene containing 500 ppm calcium stearate, 600 ppm Irgafos 168, 1000 ppm Irganox 1010), and has a premodified melt flow rate of 0.8 g/10 minutes (condition 230 C/2.16 kg) and a final (post-modified) MFR of 0.4 g/10 minutes (also condition 230 C/2.16 kg) prepared using the process of any of the following U.S. patents: U.S. Pat. No. 6,528,136; U.S. Pat. No. 6,143,829; U.S. Pat. No. 6,359,073 and of WO 99/10424.

| Temperature (F.) | Comparative Example 3 | Comparative Example 4 | EXCEED 1012CA | Example 1 | Comparative Ex 2 | Polymer E | Polymer A |
|---|---|---|---|---|---|---|---|
| 200 | | | | | | 73 | |
| 205 | | | | | | 100 | |
| 210 | | | 67 | | | 100 | |
| 215 | | | 80 | | | 100 | |
| 220 | | 93 | 93 | 80 | | 100 | |
| 225 | 67 | 94 | 93 | 93 | 47 | 100 | |
| 230 | 100 | 100 | 93 | 100 | 47 | 100 | |
| 235 | 100 | 100 | 100 | 100 | 80 | 100 | |
| 240 | 100 | 100 | 100 | 100 | 67 | 100 | 73 |
| 245 | 100 | 100 | 100 | 100 | 100 | 100 | 100 |
| 250 | 100 | 100 | 100 | 100 | 100 | 100 | 100 |
| 255 | 100 | 100 | 100 | 100 | 100 | 100 | 100 |
| 260 | 100 | 100 | 100 | 100 | 100 | 100 | 100 |
| 265 | 100 | 100 | 100 | 100 | 100 | 100 | 100 |
| 270 | 100 | 100 | 100 | 100 | 100 | 100 | 100 |
| 275 | 100 | 100 | 100 | 100 | 100 | 100 | 100 |
| 280 | 100 | 100 | 100 | 100 | 100 | 100 | 100 |
| 285 | 100 | 100 | 100 | 100 | 100 | 100 | 100 |

FIG. 5 shows heat seal data (average peak load versus temperature) for three layer film structures using the various polymer compositions described above as the sealant layer.

Figure 6:
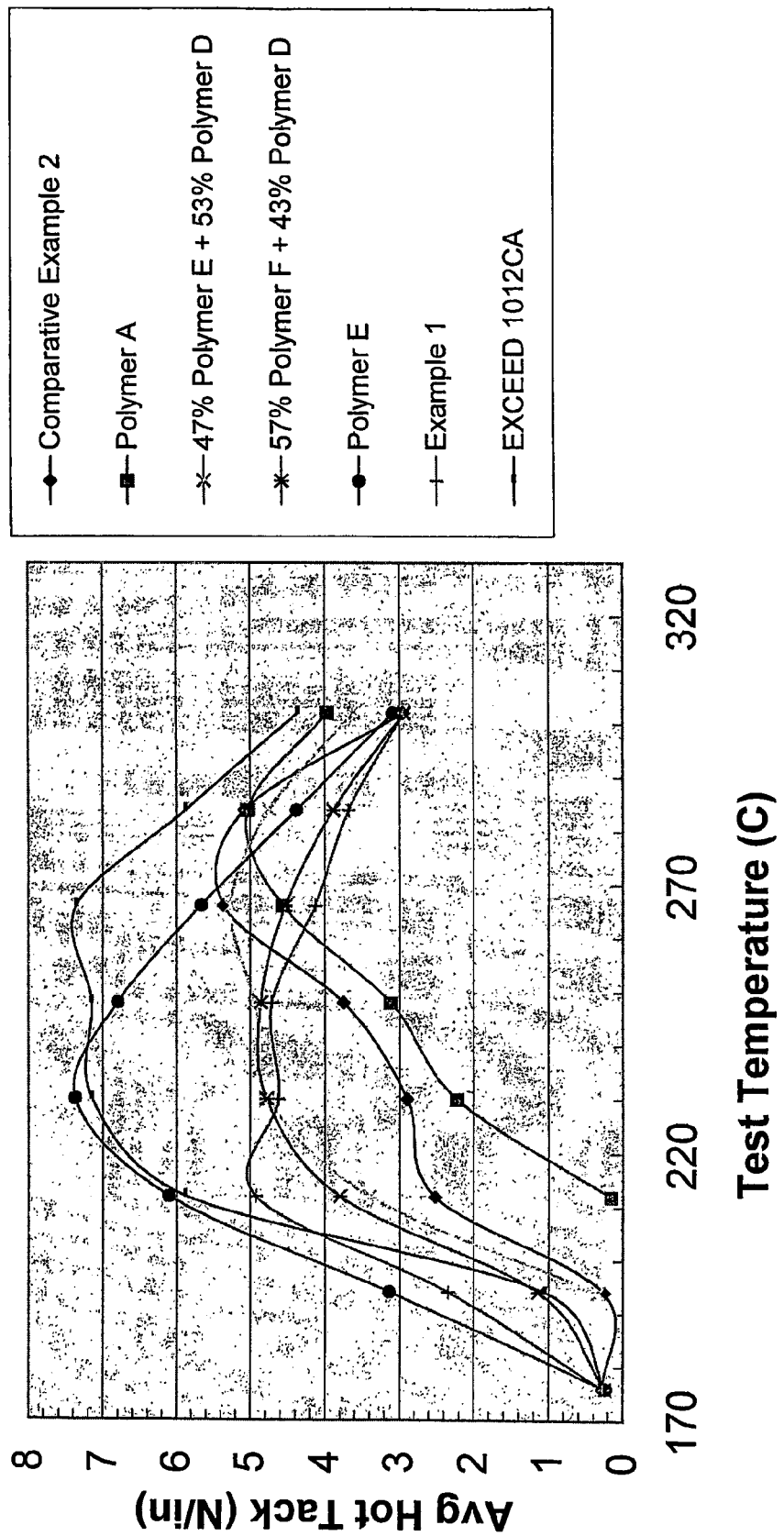
FIG. 6 shows hot tack data (average hot tack versus temperature) for three layer film structures using various polymer compositions as the sealant layer.

FIG. 6 shows hot tack data (average hot tack versus temperature) for three layer film structures using the various polymer compositions described above as the sealant layer.

Example 2

Figure 7:
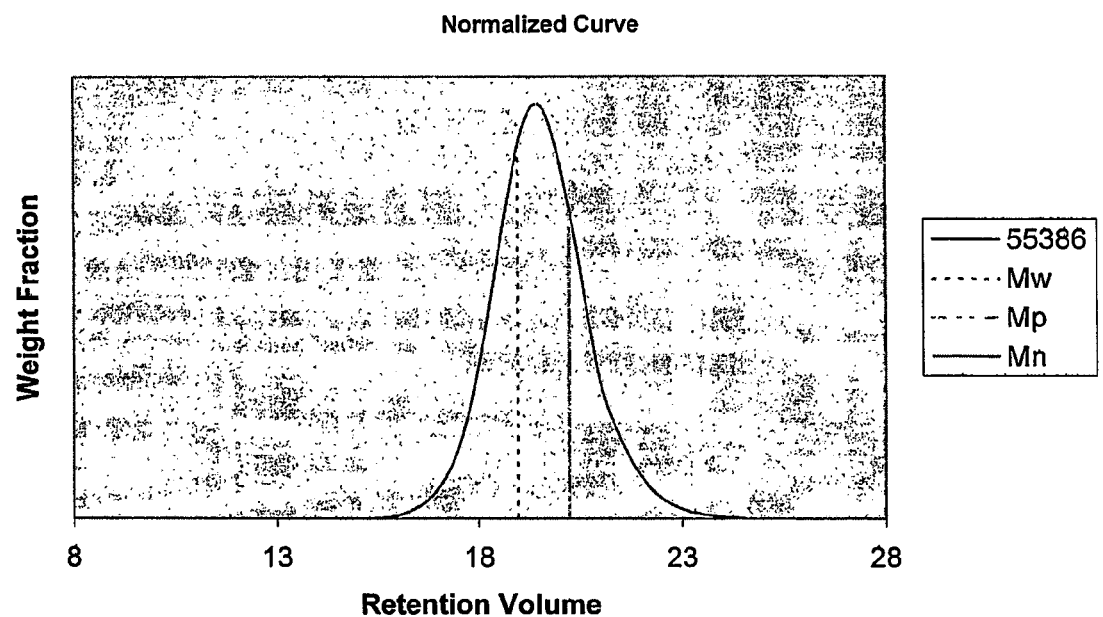
FIG. 7 shows the gel permeation chromatography curve and data for Example 2.
Figure 8:
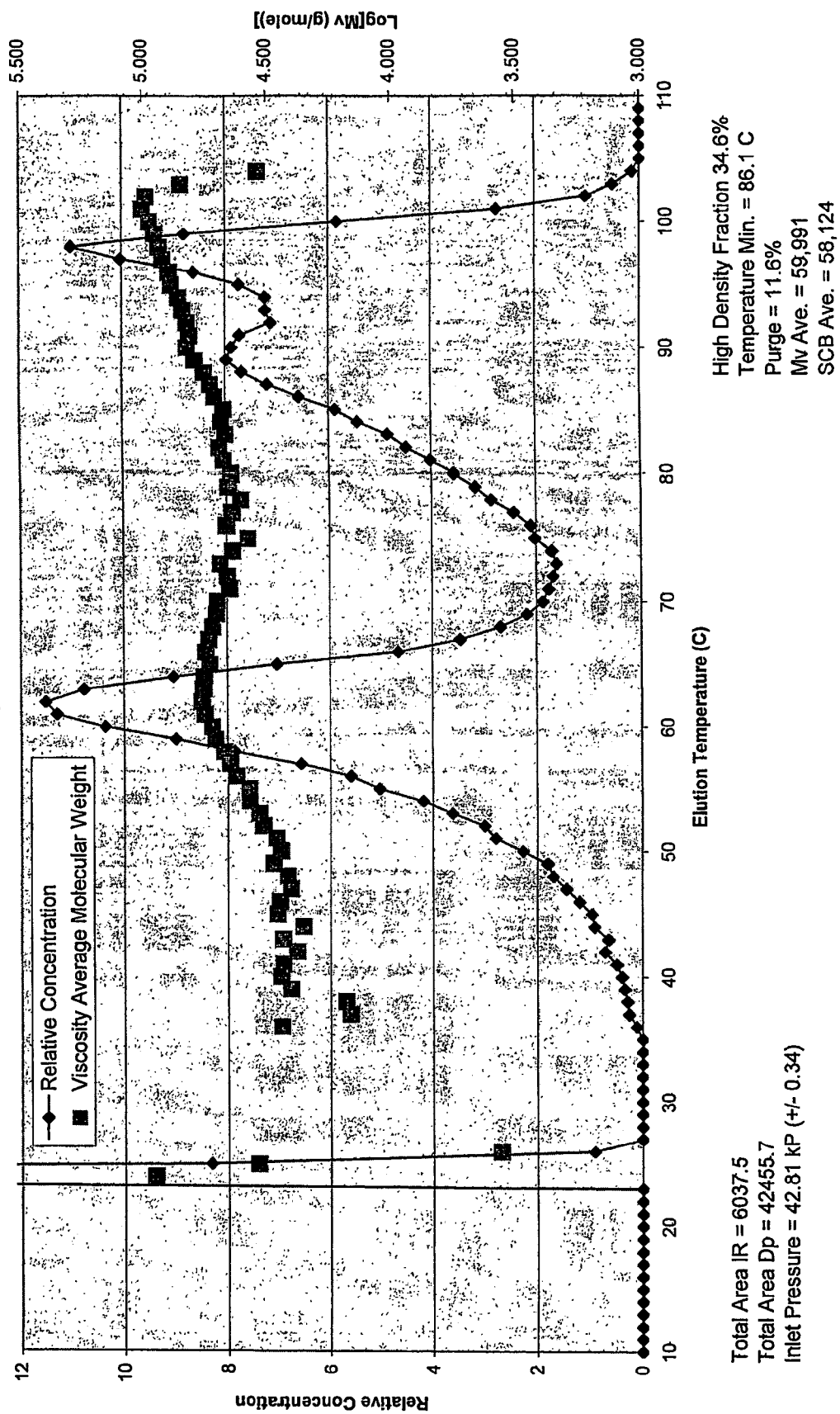
FIG. 8 shows the ATREF-DV for Example 2.
Figure 9:
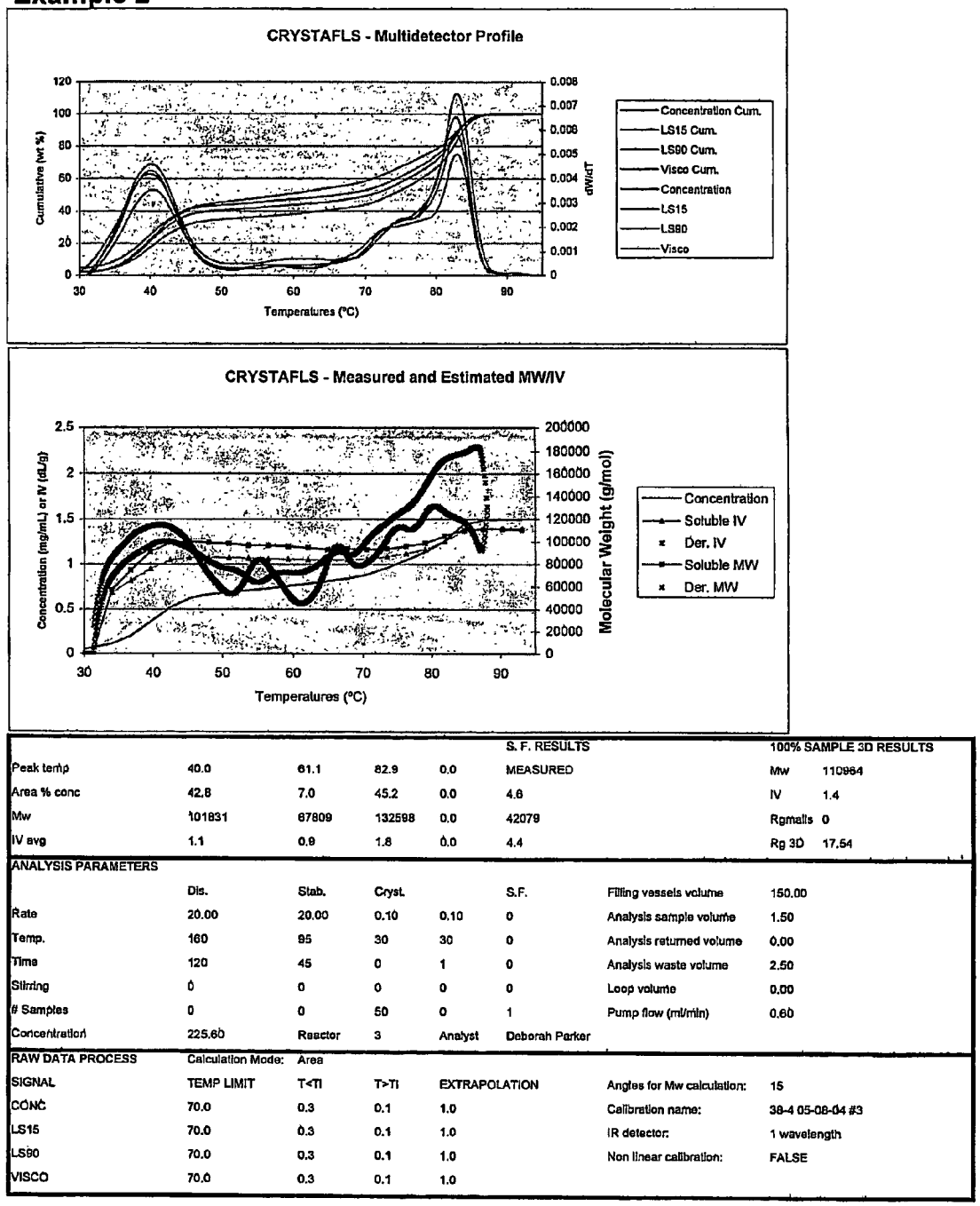
FIG. 9 shows the CRYSTAF-LS data for Example 2.

Example 2 was an in-situ blend made according to U.S. Pat. No. 5,844,045, U.S. Pat. No. 5,869,575 and U.S. Pat. No. 6,448,341, wherein the homogeneously branched polymer was made in a first reactor and was an ethylene/1-octene copolymer having a melt index ($I_2$) of 2.5 g/10 min., and a density of 0.895 g/cm$^3$, a melt flow ratio ($I_{10}/I_2$) of 6.5 and a molecular weight distribution (Mw/Mn) of 2.1 and comprises 43 percent (by weight of the total composition). A heterogeneously branched ethylene/1-octene copolymer was made in a second reactor operated sequentially with the first reactor and has a melt index ($I_2$) of 0.86 g/10 min., and a density of 0.926 g/cm$^3$ and comprises the remaining 57 percent (by weight of the total composition). The total composition has a melt index ($I_2$) of 1.5 g/10 min, a density of 0.914 g/cm$^3$, a melt flow ratio ($I_{10}/I_2$) of 7.6 and a molecular weight distribution (Mw/Mn) of 3. FIG. 7 shows the gel permeation chromatography (GPC) curve for this Example. FIG. 8 shows the short chain branching distribution (as measured by analytical temperature rising elution fractionation equipped with a differential viscometer (ATREF-DV)). FIG. 9 shows the short chain branching distribution (SCBD) and corresponding molecular weights across the SCBD as measured by CRYSTAF LS. This composition was made into monolayer blown film according to the conditions described in Table 1. The resultant monolayer film properties were reported in Table 6. This resin was used as a sealant in a coextruded blown film fabricated according to the conditions described in Table 5. The structure of the coextruded film was 1 mil polymer G/1 mil Polymer H/1.5 mil example 2, where:

Polymer G was Capron CA95QP commercially available polyamide copolymer 66/6 (nylon 66/6) from BASF.

Polymer H was PRIMACOR 1410, an ethylene acrylic acid copolymer (melt index of 1.5 g/10 minutes and 9.7 weight percent acrylic acid) commercially available from The Dow Chemical Company.

TABLE 5

Coextruded Blown Film Fabrication Conditions

| | |
|---|---|
| Blow up ratio | 2.5 |
| Die | 8 in Coex |
| Die Gap | 70 mil |
| Melt Temperature | Floats around 440-460° F. |
| Gauge | 3.5 mil |

The film properties reported in Table 6 were measured as follows. Dart impact (type B) of the films was measured in accordance with ASTM D-1709-85; Elmendorf tear (type B) was measured in accordance with ASTM D-1922; Haze was measured in accordance with ASTM D-10003; 45 Degree Gloss was measured in accordance with ASTM D-2457; Clarity was measured in accordance with ASTM D-1746.

In general, films made from the novel formulated ethylene/alpha-olefin compositions exhibit an especially good combination of optics (haze, 45 degree gloss, and clarity) and Elmendorf tear.

TABLE 6

Film properties of Example 2

| | Example 2 |
|---|---|
| Resin Characteristics | |
| $I_2$ (g/10 min) | 1.52 |
| Density (g/cm$^3$) | 0.9137 |
| $I_{10}/I_2$ | 7.59 |
| Component A $I_2$ (g/10 min) | 2.5 |
| Component A Density (g/cm$^3$) | 0.892 |
| Wt Fraction of Component A (percent) | 43 |
| Component B $I_2$ (g/10 min) | 0.86 |
| Component B Density (g/cm$^3$) | 0.926 |
| Fabrication Conditions (2.0 mil) | |
| Screw Speed (rpm) | 53.1 |
| Output rate (lb/hr) | 120.3 |
| Percent Full load current | 44.7 |
| Horsepower | 13 |
| Backpressure - Screen (psi) | 3790 |
| Melt Temperature (F.) | 443 |
| Layflat (in) | 23.5 |
| Blow up ratio | 2.5 |

TABLE 6-continued

Film properties of Example 2

|  | Example 2 |
|---|---|
| Frostline Height (in) | 25 |
| Die Gap (mil) | 70 |
| 2.0 mil Film Physical Properties | |
| Clarity | 96.6 |
| Gloss 45 deg | 78.3 |
| Haze (percent) | 7.5 |
| Dart B (g) | 470 |
| CD Elmendorf Tear: Type B (g) | 1266 |
| CD Normalized Elmendorf Tear: Type B (g) | 598.6 |
| MD Elmendorf Tear: Type B (g) | 951 |
| MD Normalized Elmendorf Tear: Type B (g) | 468.6 |

Figure 10:
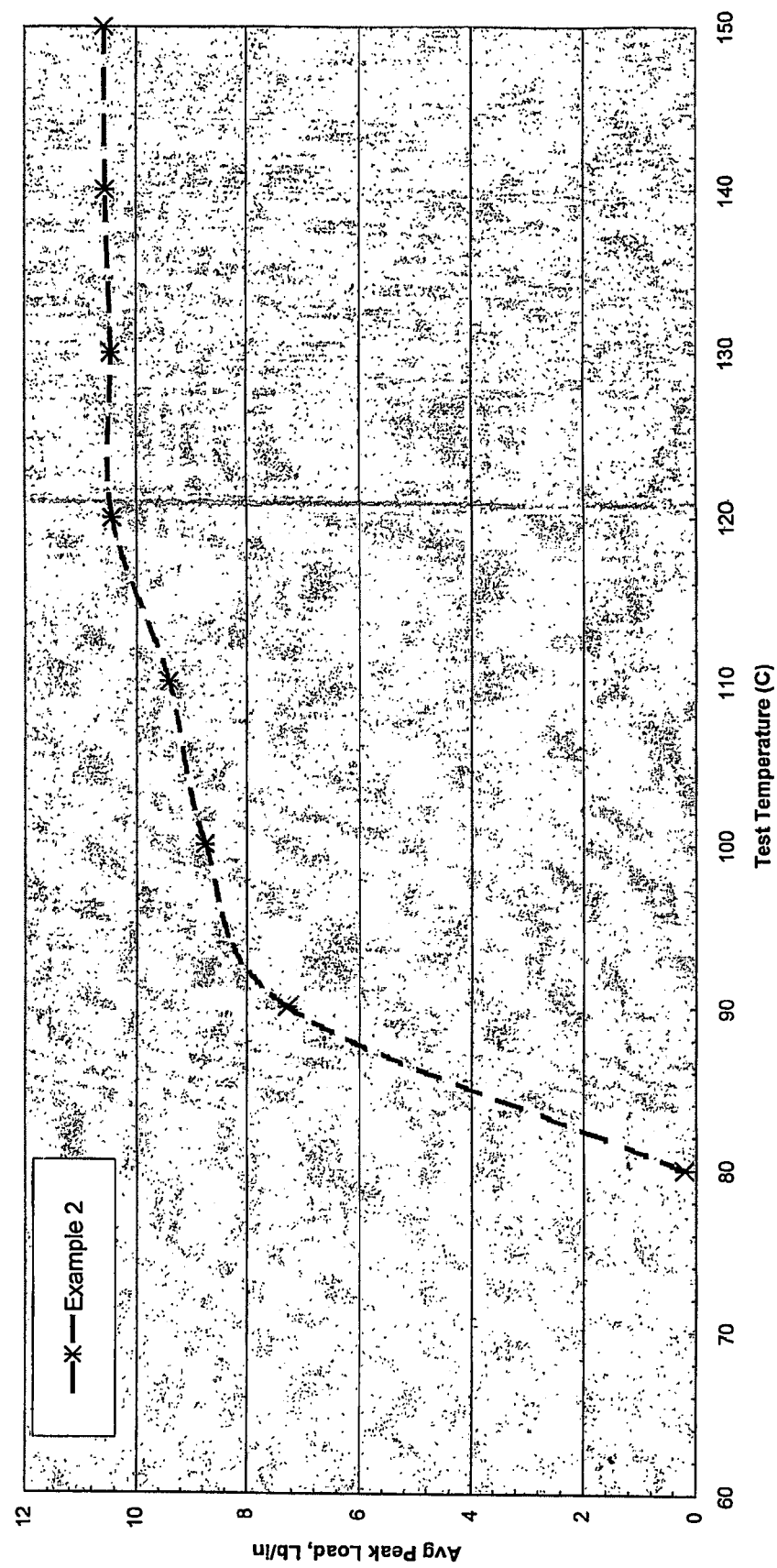
FIG. 10 shows heat seal data for a 3 layer structure using Example 2 as the sealant layer.

FIG. 10 shows heat seal data (average peak load versus temperature) for the three layer film structure using example 2 as the sealant layer.

Figure 11:
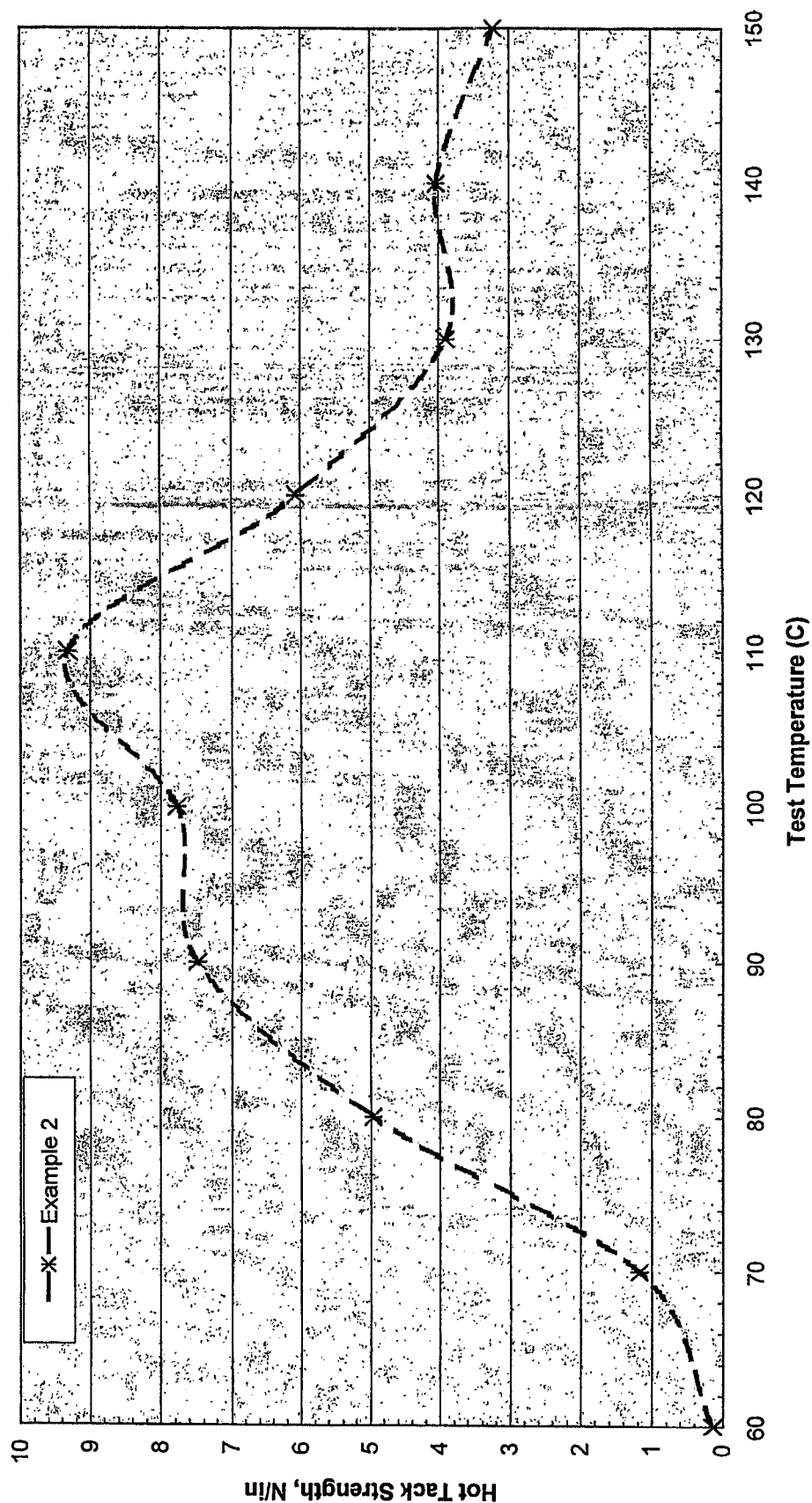
FIG. 11 shows hot tack data for a 3 layer film structure using Example 2 as the sealant layer.

FIG. 11 shows hot tack data (average hot tack versus temperature) for the three layer film structure using example 2 as the sealant layer.

In general, films containing sealant layers made from the novel formulated ethylene/alpha-olefin compositions exhibit excellent heat seal performance.

The invention claimed is:

1. A film layer made from a polymer composition, wherein the composition comprises
(A) from 10 percent (by weight of the total composition) to 95 percent (by weight of the total composition) of at least one homogeneously branched ethylene/alpha-olefin interpolymer having:
(i) a density from 0.86 grams/cubic centimeter (g/cm$^3$) to 0.92 g/cm$^3$,
(ii) a molecular weight distribution (Mw/Mn) from 1.8 to 2.8,
(iii) a melt index (I$_2$) from 0.2 grams/10 minutes (g/10 min) to 200 g/10 mm,
(iv) substantially no high density fraction; and
(B) from 5 percent (by weight of the total composition) to 90 percent (by weight of the total composition) of at least one heterogeneously branched ethylene polymer having a density from 0.88 g/cm$^3$ to 0.945 g/cm$^3$;
wherein the polymer composition has a melt index which is from 0.5 grams/10 minutes to 30 grams/10 minutes and which is lower than the melt index of component (A).

2. The film layer of claim 1 having a heat seal initiation temperature of no greater than 105° C.

3. The film layer of claim 1 wherein the homogeneously branched ethylene/alpha olefin polymer of component (A) is an interpolymer of ethylene with at least one C$_3$-C$_{20}$ alpha-olefin.

4. The film layer of claim 1 wherein the heterogeneously branched ethylene polymer is a copolymer of ethylene and a C$_3$-C$_{20}$ alpha-olefin.

5. The film layer of claim 1 wherein the heterogeneously branched ethylene polymer is a copolymer of ethylene and 1-octene.

6. The film layer of claim 1 wherein (B) has a density higher than the density of the composition.

7. The film of claim 1, wherein the composition comprises more than 40 percent (by weight of the total composition) of Component (A).

* * * * *